United States Patent
Barwicz et al.

(10) Patent No.: US 9,701,872 B2
(45) Date of Patent: Jul. 11, 2017

(54) PICKTIP HAVING NON-PLANAR TOPOGRAPHY

(71) Applicant: International Business Machines Corporation, Armonk, NY (US)

(72) Inventors: Tymon Barwicz, Westchester (CA); Paul F. Fortier, Quebec (CA); Stephane Harel, Quebec (CA); Simon LaFlamme, Quebec (CA); Roch Thivierge, Quebec (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 204 days.

(21) Appl. No.: 14/493,980

(22) Filed: Sep. 23, 2014

(65) Prior Publication Data

US 2016/0082711 A1 Mar. 24, 2016

(51) Int. Cl.
| | | |
|---|---|---|
| *B25B 11/00* | (2006.01) | |
| *C09J 5/00* | (2006.01) | |
| *F16B 11/00* | (2006.01) | |
| *B29C 65/48* | (2006.01) | |
| *B29C 65/78* | (2006.01) | |
| *B29C 65/00* | (2006.01) | |
| *B29C 65/14* | (2006.01) | |

(52) U.S. Cl.
CPC ............ *C09J 5/00* (2013.01); *F16B 11/006* (2013.01); *B29C 65/1406* (2013.01); *B29C 65/4845* (2013.01); *B29C 65/7847* (2013.01); *B29C 66/81267* (2013.01); *C09J 2205/31* (2013.01)

(58) Field of Classification Search
CPC ....... B25B 11/00; B25B 11/02; B25B 11/005; B32B 37/144; B32B 37/0046
See application file for complete search history.

(56) References Cited

U.S. PATENT DOCUMENTS

| | | | |
|---|---|---|---|
| 4,741,796 A | 5/1988 | Althaus | |
| 5,018,936 A | 5/1991 | Izumi | |
| 5,033,783 A | 7/1991 | Izumi | |
| 6,184,972 B1 * | 2/2001 | Mizutani | G03F 7/707 269/21 |
| 6,203,082 B1 | 3/2001 | Bendat | |
| 6,320,706 B1 | 11/2001 | Richard | |
| 6,474,710 B2 | 11/2002 | Bendat | |

(Continued)

OTHER PUBLICATIONS

B. G. Yacobi et al., "Adhesive bonding in microelectronics and photonics," Journal of Applied Physics, vol. 91, No. 10, 2002, pp. 6227-6262.

(Continued)

*Primary Examiner* — Lee D Wilson
(74) *Attorney, Agent, or Firm* — Cantor Colburn LLP; Vazken Alexanian

(57) ABSTRACT

A picktip is provided and includes a picktip member configured to extend along a longitudinal axis defined in parallel with emissions from an ultraviolet (UV) light source. The picktip member partially includes UV transparent material through which the emissions are directed and has an end face from which the emissions are exited. The picktip member defines vacuum pathways terminating at the end face, and the end face has a non-planar topography.

16 Claims, 6 Drawing Sheets

(56) References Cited

U.S. PATENT DOCUMENTS

| | | | |
|---|---|---|---|
| 6,769,969 B1 * | 8/2004 | Duescher | B24B 1/00 |
| | | | 451/287 |
| 6,974,168 B2 | 12/2005 | Capewell | |
| 8,625,879 B2 | 1/2014 | Motohara | |
| 2002/0168147 A1 | 11/2002 | Case | |
| 2014/0036353 A1 * | 2/2014 | Krogdahl | B29C 66/73361 |
| | | | 359/350 |
| 2016/0082711 A1 * | 3/2016 | Barwicz | C09J 5/00 |
| | | | 156/273.7 |

OTHER PUBLICATIONS

List of IBM Patents or Patent Applicaqtions Treated as Related; (Appendix P), filed Aug. 4, 2014; 2 pages.
Tymon Barwicz et al.; "Component Assembly Apparatus", U.S. Appl. No. 14/494,008, filed Sep. 23, 2014.

* cited by examiner

Purposeful low angle chamfer on picktip edge to increase the bondline locally for better device performance

PICKTIP HAVING NON-PLANAR TOPOGRAPHY

BACKGROUND

The present invention relates to a picktip, a picktip apparatus and a method of adhering an ultraviolet (UV) transparent component to a bottom component and, more specifically, to a picktip having an end face with a non-planar topography.

In various technologies, there is frequently a need for attaching two components together by means of an adhesive that is curable by exposure to ultraviolet (UV) light using high throughput automated assembly tools. The use of such adhesive facilitates the high throughput operations as the adhesive can be cured relatively quickly by a short burst of UV light. In any case, the structural integrity of the couplings between the two components is critical and respective sizes of gaps between the complementary surfaces or contact areas must remain unchanged after the UV tack process is complete.

It has been found, however, that current techniques for adhering components using UV curable adhesive may not perform well if one component of the assembly is flexible. In such cases, if one or both of the assembly tools used to bring the components together is not sufficiently UV transparent, portions of the UV curable adhesive may not be fully exposed to UV light. In these cases, the flexible component can show undesirable separation (also called bond line) to the surface of the other component or undesirable bonding strength.

SUMMARY

According to an embodiment of the present invention, a picktip is provided and includes a picktip member configured to extend along a longitudinal axis defined in parallel with emissions from an ultraviolet (UV) light source. The picktip member partially includes UV transparent material through which the emissions are directed and has an end face from which the emissions are exited. The picktip member defines vacuum pathways terminating at the end face, and the end face has a non-planar topography.

According to another embodiment, a picktip apparatus is provided. The picktip apparatus includes a picktip partially including ultraviolet (UV) transparent material and having a first end face, a second end face opposite the first end face from which UV light passing through the UV transparent material is exited and defining vacuum pathways terminating at the second end face. The picktip apparatus further includes an optical element configured to emit the UV light and a window element disposable along an optical path of the UV light and a spine configured to secure the picktip, the optical element and the window element such that a vacuum region communicative with the vacuum pathways is defined between the picktip and the window element. The vacuum region includes a first portion disposed along a plane of the first end face and a second portion oriented transversely with respect to the first portion.

According to yet another embodiment, a method of adhering an ultraviolet (UV) transparent component to a bottom component is provided. The method includes dispensing ultraviolet (UV) curable adhesive on the bottom component, vacuuming the UV transparent component into an end face of a picktip partially formed of UV transparent material and defining vacuum pathways terminating at the end face, bringing the UV transparent component and the bottom component into aligned contact and retracting the picktip from the UV transparent component with the adhesive cured.

DETAILED DESCRIPTION

Figure 1:
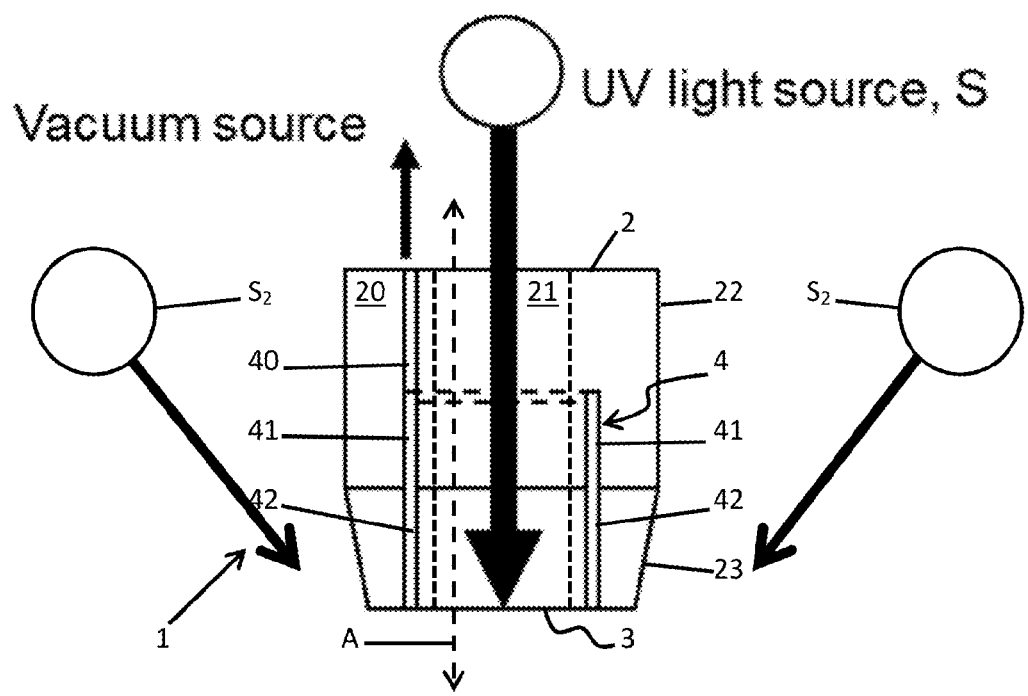
FIG. 1 is a schematic side view of a picktip in accordance with embodiments.

As will be described below, a picktip is provided for attachment of two components together by means of an adhesive that is curable by exposure to ultraviolet (UV) light using high throughput automated assembly tools. The picktip is formed of UV transparent materials, such as fused silica and alumina, so that an additional portion of the UV curable adhesive beyond the conventional portion can be exposed to the UV light. In addition, since UV transparent materials can be difficult to machine, the portion of the picktip that is formed of the UV transparent materials is relatively small and the picktip is otherwise formed with vacuum pathways that allow the picktip to lift at least one of the components (i.e., the UV transparent, flexible one of the components). Moreover, the picktip has an end face that is not planar so as to influence the bondline thickness between the components in a desired manner.

With reference to FIGS. 1-5, a picktip 1 is provided. The picktip 1 includes a picktip member 2, which is configured to extend along a longitudinal axis A. The longitudinal axis A is defined in parallel with emissions from an ultraviolet (UV) light source S where the emissions may include UV light having a wavelength of about 200 to 500 nanometers (nm), about 300 to 400 nm or about 365 to 385 nm. The picktip member 2 includes first parts 20 and second parts 21. The first parts 20 may be non-transparent with respect to the emissions of the UV light source S and may be formed of relatively easily machined materials, such as aluminum and/or stainless steel or may be UV transparent. The second parts 21 include UV transparent materials and are disposed in the picktip member 2 such that the emissions of the UV light source S are directed through the second parts 21. The picktip member 2 has an end face 3 from which the emissions of the UV light source S are exited from the UV transparent materials of the second parts 21.

For the purposes of the present description, it is to be understood that UV transparency refers to cases where a material shows or exhibits notable optical transparency to UV light such that the material transmits more than about 10% of incident UV light. In certain cases, UV transparency refers to cases where the material transmits more than about 25% of incident UV light. In still other cases, UV transparency refers to cases where the material transmits more than about 50% of incident UV light. In accordance with embodiments, the UV transparent materials of the second parts 21 may include one or more of fused quartz/fused silica ($SiO_2$), sapphire/alumina ($Al_2O_3$), calcium fluoride ($CaF_2$), magnesium fluoride ($MgF_2$), Cyclic Olefin Copolymer, and Polyethylene terephthalate.

The picktip member 2 is formed to define two or more vacuum pathways 4. These vacuum pathways terminate at the end face 3. In operation, the end face 3 of the picktip member 2 is placed into contact with a UV transparent, flexible component (see FIG. 4) that is to be lifted up and then brought into contact with another component to which the UV transparent, flexible component is to be adhered. The lifting process is engaged by applying negative pressure (i.e., a vacuum) to the vacuum pathways 4 with the end face 3 contacting the UV transparent, flexible component. The vacuum pathways 4 may be drilled or machined.

In accordance with embodiments, the picktip member 2 may include a first, or main portion 22 and a second, or tapered tip portion 23. The main portion 22 has a generally uniform width or thickness and is formed to define a main vacuum pathway 40 as well as sub-pathways 41 that break off from the main vacuum pathway 40 and are fluidly communicative with the main vacuum pathway 40. The tapered tip portion 23 is formed to define extensions 42 of the sub-pathways 41 that extend toward the end face. Although the main vacuum pathway 40, the sub-pathways 41 and the extensions 42 may have various and multiple configurations, they generally extend along the longitudinal axis A such that the UV transparent, flexible component can be pulled into the end face 3 during operation of the picktip member 2.

Figure 2:
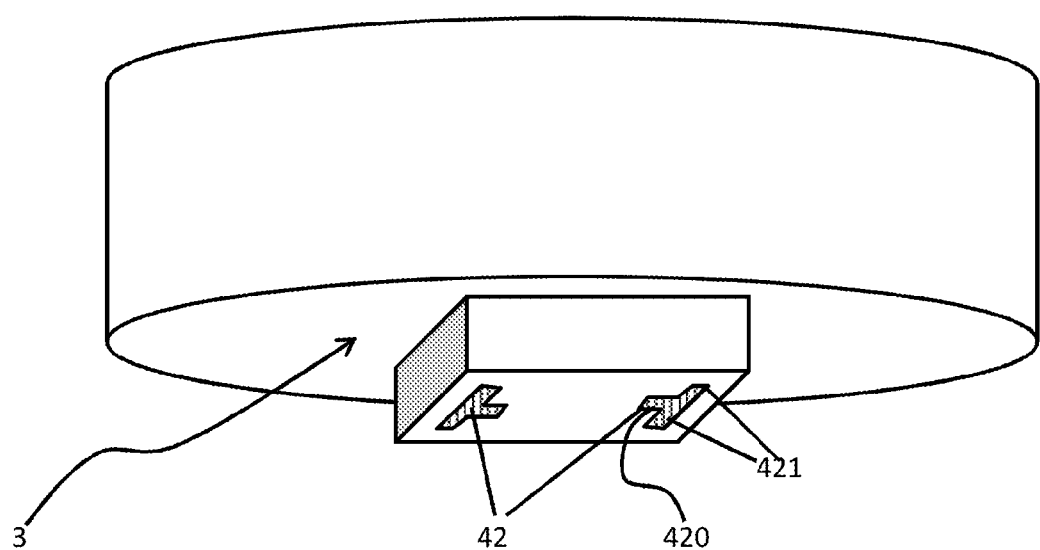
FIG. 2 is a perspective view of the end face of the picktip of FIG. 1 in accordance with further embodiments.
Figure 3:
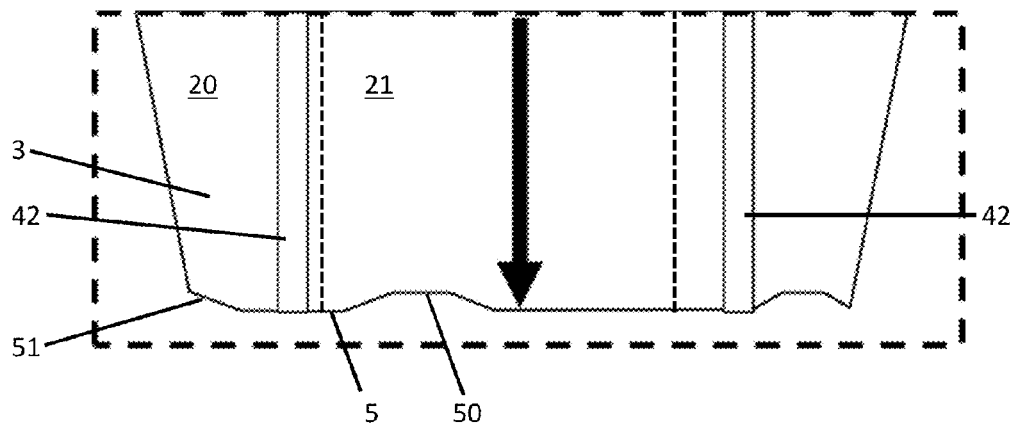
FIG. 3 is an enlarged view of the end face of the picktip of FIGS. 1 and 2 in accordance with further embodiments.

In accordance with further embodiments, the sub-pathways 41 and the extensions 42 are defined at opposite sides of the main portion 22 and the tapered tip portion 23, respectively. As such, the vacuumed pulling of the UV transparent, flexible component into the end face 3 can be applied relatively evenly across a substantial portion of the complementary surfaces of the end face 3 and the UV transparent, flexible component. In accordance with still further embodiments and, as shown in FIG. 2, cross-sections of the sub-pathways 41 and the extensions 42 may be T-shaped with a central passage 420 and opposed side passages 421 extending in opposite directions away from the central passage 420.

In addition, although it is not required, the picktip member 2 may have a minimally sized path of UV transparency. That is, the main vacuum pathway 40, the sub-pathways 41 and the extensions 42 may be defined in the first parts 20 of the picktip member 2. In this way, the machining required to form the main vacuum pathway 40, the sub-pathways 41 and the extensions 42 can be executed with respect to materials that are generally more easily machined than the materials of the second parts 21 of the picktip member 2

As another configuration, the main vacuum pathway 40 and the sub-pathways 41 may be defined in the first parts 20 of the main portion 22 of the picktip member 2. In this way, the drilling or machining required to form the main vacuum pathway 40 and the sub-pathways 41 can be executed with respect to materials (i.e., non-UV transparent materials) that are generally more easily machined than the materials (i.e., UV transparent materials) of the second parts 21 of the main portion 22 of the picktip member 2. Meanwhile, an entirety of the tip portion 23 (including the first parts 20 and the second parts 21) may be formed of UV transparent materials even where the extensions 42 are formed. In this case, the uniformity of the UV transparency of the tip portion 23 aids in more uniform cure of the UV adhesive 53. Meanwhile, the UV transparent material being drilled or machined for forming the extensions 42 is limited to only drilling and machining with respect to the tip portion 23. Moreover, main portion 22 could still use a minimally sized path of UV transparency with the main vacuum pathway 40 and the sub-pathways 41 being defined through easily machined materials and tip portion 23 being entirely in the light path established by the minimally sized path of UV transparency through the main portion 22.

In an exemplary configuration, the first parts 20 of the picktip member 2 will occupy a peripheral region and coaxially surround a central region occupied by the second parts 21. Thus, a path of UV transparency for the picktip member 2 will run through only the second parts 21 in the central region while the vacuum pathways 4 will run through only the first parts 20 in the peripheral region. Thus, UV curing can occur at a portion of an adhesive layer (see FIG. 4 and the following discussion of the UV curable adhesive 53) associated with the central region due to UV light propagating through the central region and at portions of the adhesive layer associated with the peripheral regions due to optional UV light provided from laterally disposed light sources $S_2$ (see FIG. 1).

In accordance with further embodiments, where the first parts 20 of the picktip member 2 occupy the peripheral region and coaxially surround the central region occupied by the second parts 21, the first and second parts 20 and 21 may be coupled to one another in various manners. For example, the coupling may be achieved by adhesive being provided between complementary radial surfaces of the first and second parts 21 and 22 or by the first and second parts 20 and 21 including threading or mechanically interfering features.

In accordance with still further embodiments, the end face 3 of the picktip member 2 has a non-planar topography 5. Effects of this non-planar topography 5 can be viewed in FIG. 5 where the material in the top-left of the image has a different topography from the rest of the material in the image. The topological differences are evidenced by the dark shading in the top-left of the image and the relatively light shading throughout the rest of the image since the relative darkness and lightness of the shading is indicative of a height of the material at that location. While conventional picktips have end faces that are strictly planarized, but for vacuum holes and vacuum distribution grooves that are too small to notably influence local bondlines or are displaced from the region of critical control of the bondline, the non-planar topography 5 of the end face 3 is purposefully introduced with the intention of influencing local bondline thicknesses. Control of the local bond line thickness can significantly improve the performance of some assemblies, such as photonic assemblies for example. In accordance with embodiments, the non-planar topography 5 may be non-axisymmetric and may include at least one or more of recessions 50 defined to recede into the end face 3 from a plane P of terminals of the extensions 42 and chamfered side regions 51. In the case of the chamfered side regions 51, the chamfer may have a relatively low angle at the edge of the end face 3 and would be expected to exert decreased pressure on UV curable adhesive to thereby locally increase a bondline thickness for an overall improvement in device performance.

Figure 4:
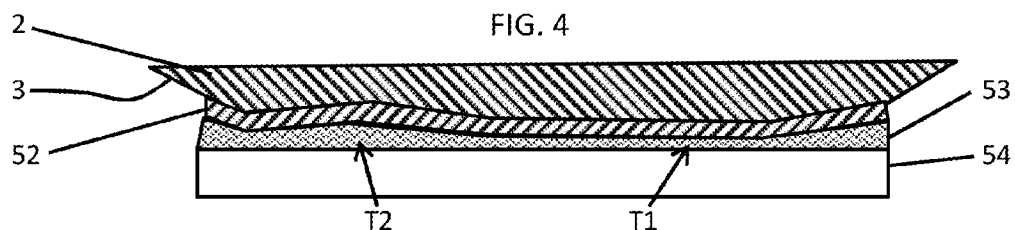
FIG. 4 is an enlarged view of components to be adhered together and the end face of the picktip of FIGS. 1-3.
Figure 5:
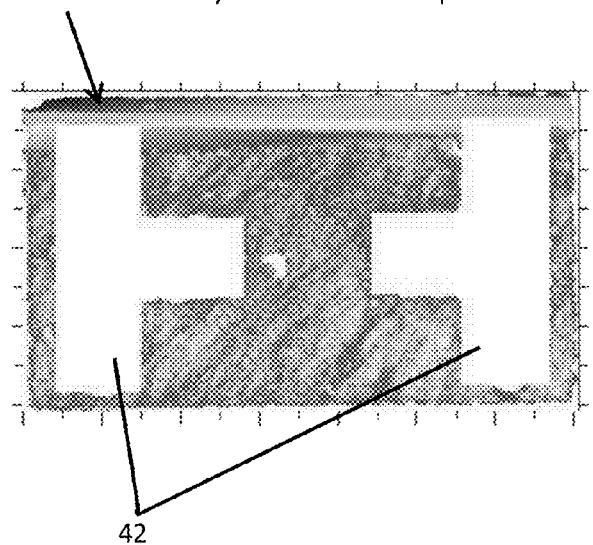
FIG. 5 is a graphical depiction of an example of non-planar topography put in practice at the end face of the picktip of FIGS. 2-4.

That is, as shown in FIG. 4, the first component 52 is flexible and conforms to the non-planar topography 5 of the end face 3. Thus, the non-planar topography 5 and the conforming first component 52 cooperatively result in a varying bondline thickness of UV curable adhesive 53 between the first component 52 and the second component 54 to which the first component 52 is to be adhered. In particular, where the end face 3 is least recessed from a contact surface of the second component 54, the UV curable adhesive 53 has a relatively thin bondline thickness T1 but, where the end face 3 is most recessed from the contact surface due to the non-planar topography 5, the UV curable adhesive 53 has a relatively thick bondline thickness T2.

It is not necessary for the component 52 to conform completely with the non-planarity of the picktip. For flexible components showing non-negligible stiffness, there will be a partial variation in local bondline that will not exactly correspond to the topography of the picktip. The correspondence between the resulting local bondline and the picktip topography can be experimentally calibrated for a given component to then design a picktip that will provide the desired, accurately controlled bondline throughout.

Figure 6:
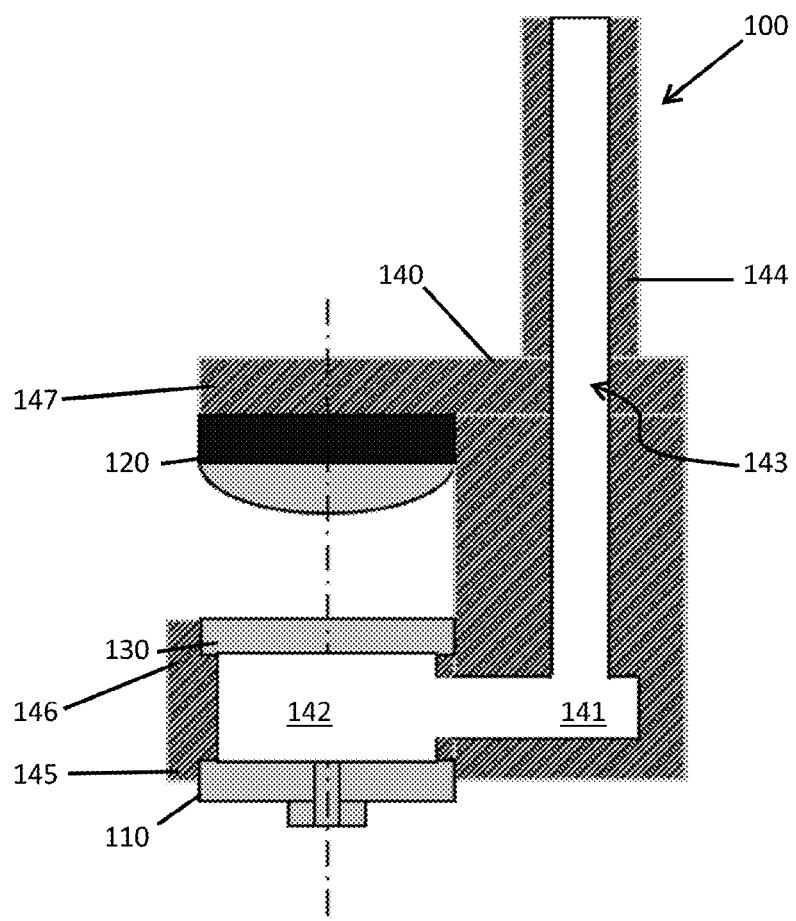
FIG. 6 is a schematic side view of a picktip apparatus in accordance with embodiments.
Figure 7:
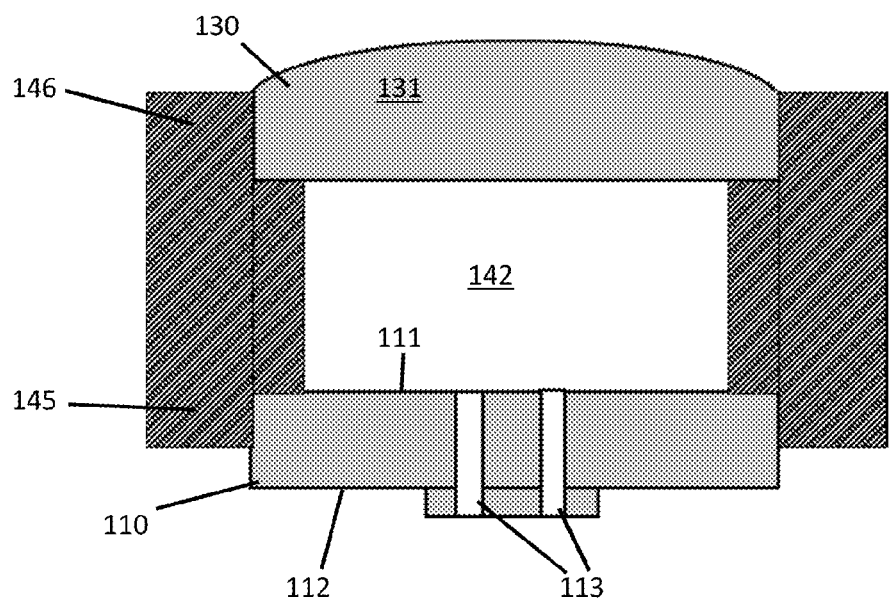
FIG. 7 is a schematic side view of a picktip apparatus in accordance with further embodiments.

With reference to FIGS. 6-10, a picktip apparatus 100 is provided, according to an alternative embodiment. As shown in FIGS. 6 and 7, the picktip apparatus 100 includes a picktip 110, an optical element 120, a window element 130 and a spine 140. The picktip 110 includes non-UV transparent materials, as noted above, and partially includes UV transparent materials. The picktip 110 has a first end face 111, a second end face 112, which is disposed opposite from the first end face 111 and from which UV light passing through the UV transparent materials is exited from the UV transparent materials. The picktip 110 is further formed to define at least two or more vacuum pathways 113, which respectively terminate at the second end face 112. The optical element 120 is configured to emit the UV light, which may be directed into and through the UV transparent materials of the picktip 110. The window element 130 is disposable along an optical path of the UV light and may be provided as a lens 131 configured to focus the UV light toward the UV transparent materials of the picktip 110.

The spine 140 is configured to secure the picktip 110, the optical element 120 and the window element 130 such that a vacuum region 141, which may be communicative with the vacuum pathways 113 of the picktip 110, is defined between the picktip 110 and the window element 130. The vacuum region 141 includes a first portion 142 and a second portion 143. The first portion 142 is disposed to extend along a plane of the first end face 111 of the picktip 110 and is interposed between the picktip 110 and the window element 130. The second portion 143 is oriented transversely with respect to the first portion 142.

In accordance with embodiments, the spine 140 includes an elongate portion 144, which is hollow and along which the second portion 143 extends. The elongate portion 144 may be coupled to a vacuum source (not shown), which is configured to generate a vacuum fluidly communicative with the vacuum pathways 113. The spine 140 may further include a picktip supportive portion 145, a window element supportive portion 146 and, in some cases, an optical element supportive portions 147. The supportive portions 145, 146 and 147 may be substantially aligned with the supportive portion 145 proximate to a proximal end of the elongate portion 144, as shown in FIG. 6, or disposed to define an angle along the optical path of the UV light, as shown in FIGS. 8-10.

As described above with reference to FIGS. 1-5, the second end face 112 of the picktip 110 may have a non-planar topography purposefully introduced with the intention of influencing local bondline thicknesses. In accordance with embodiments, the non-planar topography may be non-axisymmetric and may include at least one or more of recessions defined to recede into the second end face 112 from a plane of terminals of the vacuum pathways 113 and chamfered side regions. In the case of the chamfered side regions, the chamfer may have a relatively low angle at the edge of the second end face 112 and would be expected to locally increase a bondline thickness for an overall improvement in device performance.

Figure 8:
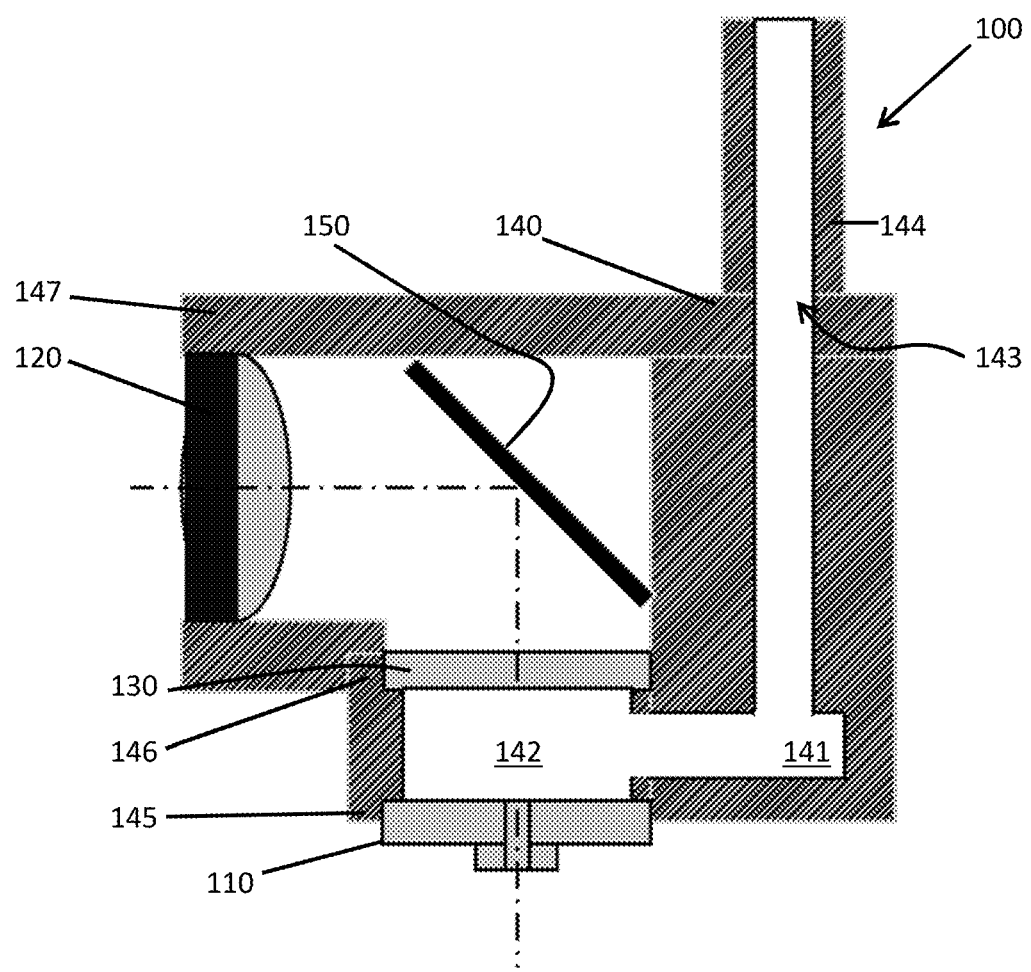
FIG. 8 is a schematic side view of a picktip apparatus in accordance with further embodiments.

In accordance with further embodiments and, as shown in FIG. 8, the picktip apparatus 100 may further include a reflective element 150. Where the spine 140 is formed to define an angle along the optical path of the UV light, the reflective element 150 may be provided as a mirror and is coupled to the spine 140 to angularly redirect the UV light. Such a configuration may provide for a compact picktip apparatus 100 and/or variable apparatus configurations.

Figure 9:
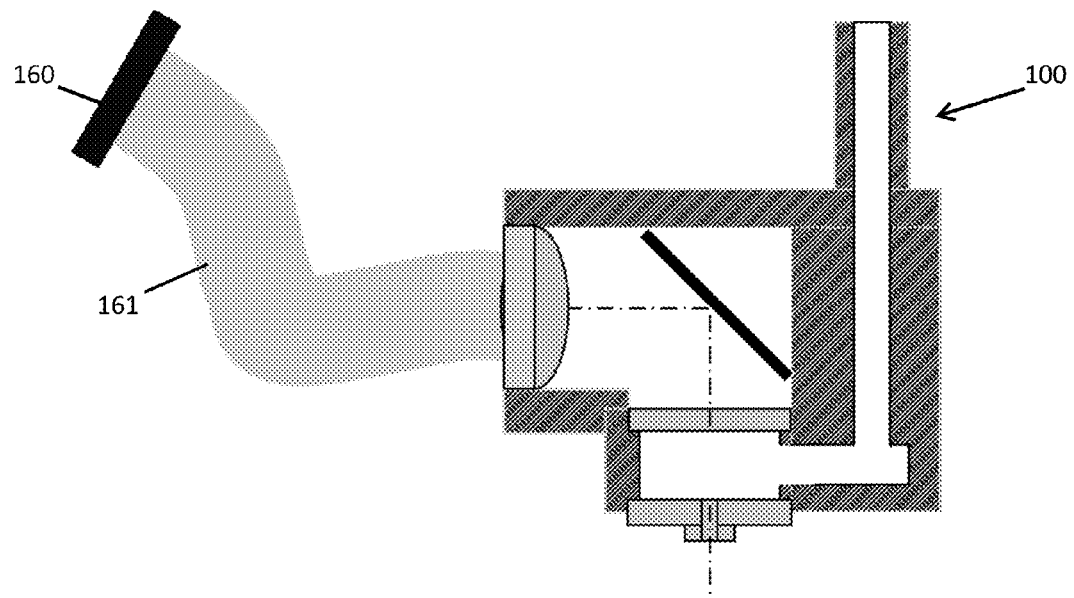
FIG. 9 is a schematic side view of a picktip apparatus in accordance with further embodiments.
Figure 10:
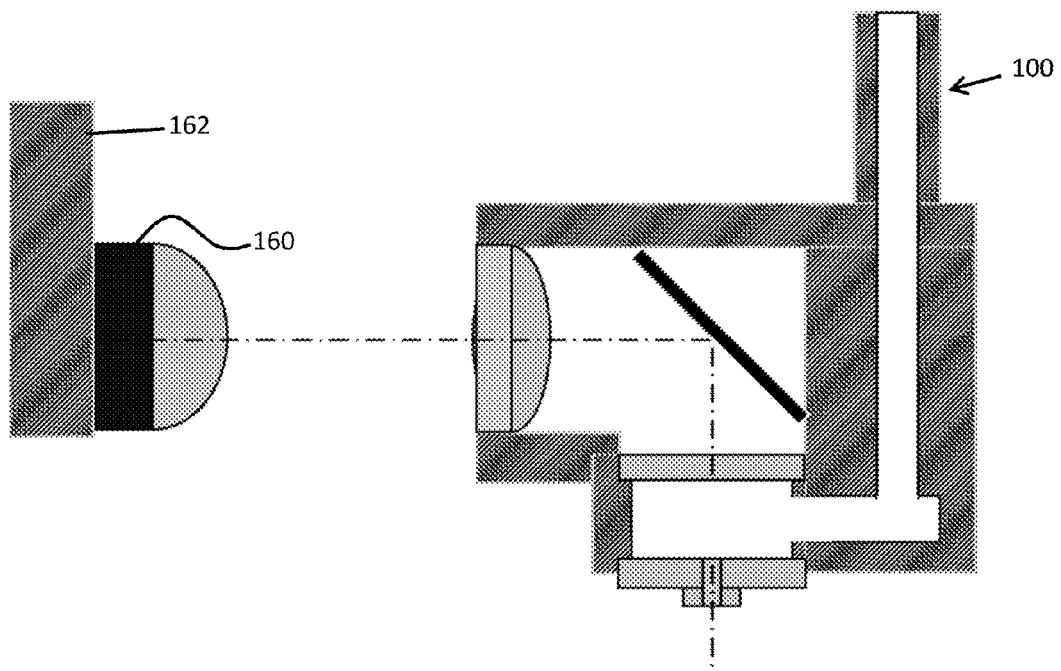
FIG. 10 is a schematic side view of a picktip apparatus in accordance with further embodiments.

In accordance with still further embodiments and, as shown in FIGS. 9 and 10, the picktip apparatus 100 may include a light source 160, which is disposed externally from the spine 140, and an optical cable 161 by which the light source 160 is optically coupled to the optical element 120 (see FIG. 9). Alternatively, the picktip apparatus 100 may include the light source 160 and a secondary spine 162, which is supportive of the light source 160 and which is movable independent of the spine 140 (see FIG. 10).

The light source S, the optical element 120 and the light source 160 may each be provided jointly or separately from one another as, for example, a Gallium nitride (GaN) light emitting diode or a mercury lamp. Also, it will be understood that the UV curable adhesive described above can be dispensed and partially or fully cured with UV light. Here, partial curing refers to sufficient curing to prevent relative movement between components or "tacking."

Figure 11:
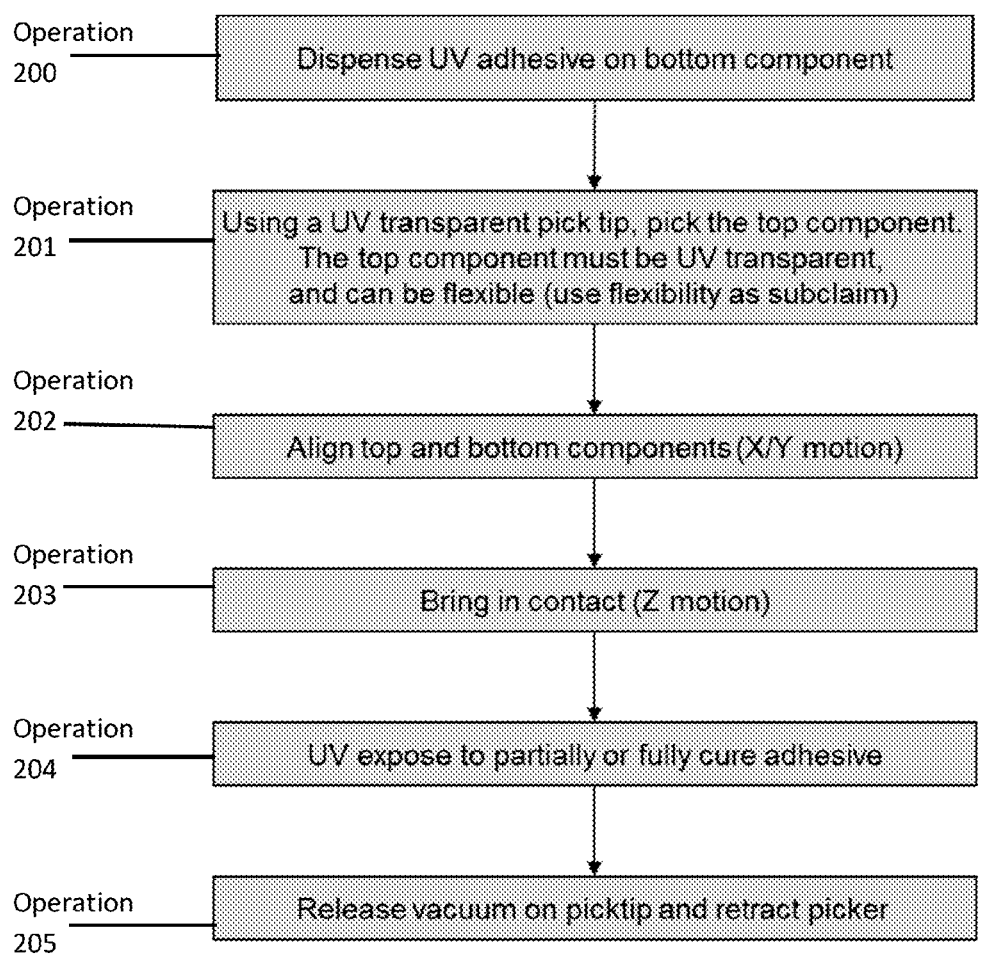
FIG. 11 is a flow diagram illustrating a method of adhering an ultraviolet (UV) transparent component to a bottom component.

With reference to FIG. 11, a method of adhering a flexible, ultraviolet (UV) transparent component to a bottom component is provided and includes dispensing ultraviolet (UV) curable adhesive on the bottom component (operation 200) and holding with a vacuum pressure the UV transparent component to a topographically non-planar end face of a picktip partially formed of UV transparent material and defining vacuum pathways terminating at the end face (operation 201). At this point, the method includes aligning the UV transparent and bottom components in X and Y axes (operation 202) and bringing the UV transparent component and the bottom component into aligned contact in a Z axis (operation 203). Finally, the method includes curing the UV curable adhesive by UV exposure (operation 204), releasing the vacuum between the end face and the UV transparent component and retracting the picktip (operation 205).

For operation 201, the force applied by the vacuum pressure may not be sufficient for the flexible component to follow the non-planar topography of the picktip end face. It will be at assembly of the flexible component to the bottom component that the pressure exerted by the adhesive will push the flexible component in full or partial conformity with the picktip end face non-planar topography.

As described above and, in accordance with embodiments, the topographically non-planar end face may be non-axisymmetric and may include at least one or more of recessions defined to recede into the end face from a plane of terminals of the vacuum pathways and chamfered side regions. In the case of the chamfered side regions, the chamfer may have a relatively low angle at the edge of the end face and would be expected to locally increase a bondline thickness for an overall improvement in device performance.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A picktip, comprising:
   a picktip member configured to extend along a longitudinal axis defined in parallel with emissions from an ultraviolet (UV) light source;
   the picktip member partially comprising UV transparent material through which the emissions are directed and having an end face from which the emissions are exited;
   the picktip member defining vacuum pathways terminating at the end face; and
   the end face having a non-planar topography.

2. The picktip according to claim 1, wherein the picktip member comprises:
   a main portion defining a main vacuum pathway and sub-pathways communicative with the main vacuum pathway; and
   a tapered tip portion defining extensions of the sub-pathways toward the end face.

3. The picktip according to claim 2, wherein the extensions of the sub-pathways are defined at opposite sides of the tapered tip portion.

4. The picktip according to claim 2, wherein cross-sections of the extensions of the sub-pathways are T-shaped.

5. The picktip according to claim 1, wherein:
   the picktip member comprises a body through which the vacuum pathways extend,
   the end face is defined at a most-distant end of the body of the picktip member along the longitudinal axis, and
   the body being formed such that the non-planar topography comprises recessions defined to recede inwardly from a plane of terminals of the vacuum pathways at the end face.

6. The picktip according to claim 5, wherein the non-planar topography comprises a chamfered side region.

7. The picktip according to claim 5, wherein the non-planar topography is non-axisymmetric.

8. A picktip apparatus, comprising:
   a picktip partially comprising ultraviolet (UV) transparent material, the picktip having a first end face, a second end face opposite the first end face from which UV light passing through the UV transparent material is exited and defining vacuum pathways terminating at the second end face;
   an optical element configured to emit the UV light; and
   a window element disposable along an optical path of the UV light; and
   a spine configured to secure the picktip, the optical element and the window element such that a vacuum region communicative with the vacuum pathways is defined between the picktip and the window element;
   the vacuum region comprising a first portion disposed along a plane of the first end face and a second portion oriented transversely with respect to the first portion.

9. The picktip apparatus according to claim 8, wherein the second end face has a non-planar topography.

10. The picktip apparatus according to claim 8, wherein the non-planar topography comprises recessions defined to recede from a plane of terminals of the vacuum pathways.

11. The picktip apparatus according to claim 8, wherein the non-planar topography comprises a chamfered side region.

12. The picktip apparatus according to claim 8, wherein the non-planar topography is non-axisymmetric.

13. The picktip apparatus according to claim 8, wherein the window element comprises a lens.

14. The picktip apparatus according to claim 8, further comprising a reflective element coupled to the spine to redirect the UV light.

15. The picktip apparatus according to claim 8, further comprising:
   a light source disposed externally from the spine; and
   an optical cable by which the light source is optically coupled to the optical element.

16. The picktip apparatus according to claim 8, further comprising:
   a light source disposed externally from the spine; and
   a secondary spine supportive of the light source, the secondary spine being movable independent of the spine.

* * * * *